United States Patent
Maeda et al.

(10) Patent No.: US 7,821,884 B2
(45) Date of Patent: Oct. 26, 2010

(54) INFORMATION RECORDING AND RETRIEVAL METHOD, AND ITS APPARATUS

(75) Inventors: Takeshi Maeda, Koganei (JP); Takeshi Shimano, Yokohama (JP); Akemi Hirotsune, Saitama (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 638 days.

(21) Appl. No.: 11/780,058

(22) Filed: Jul. 19, 2007

(65) Prior Publication Data

US 2008/0219109 A1 Sep. 11, 2008

(30) Foreign Application Priority Data

Mar. 8, 2007 (JP) .............................. 2007-058024

(51) Int. Cl.
*G11B 7/00* (2006.01)

(52) U.S. Cl. ............... 369/44.26; 369/53.28; 369/272.1

(58) Field of Classification Search ............... 369/272.1
See application file for complete search history.

(56) References Cited

U.S. PATENT DOCUMENTS

| 6,540,397 | B2 | 4/2003 | Yoshinari et al. |
| 6,977,883 | B2 | 12/2005 | Terao et al. |
| 2005/0047309 | A1 | 3/2005 | Terao et al. |
| 2005/0088921 | A1 | 4/2005 | Terao et al. |
| 2006/0018001 | A1 | 1/2006 | Kojima et al. |
| 2006/0280095 | A1* | 12/2006 | Tsukagoshi et al. ......... 369/103 |
| 2006/0291360 | A1 | 12/2006 | Maeda et al. |
| 2007/0054195 | A1* | 3/2007 | Usami ........................ 430/2 |

FOREIGN PATENT DOCUMENTS

| JP | 2004-273055 | 9/2004 |
| JP | 2005-203046 | 7/2005 |
| JP | 2006-031894 | 2/2006 |
| JP | 2007-4897 | 1/2007 |

* cited by examiner

*Primary Examiner*—Lixi Chow
(74) *Attorney, Agent, or Firm*—Antonelli, Terry, Stout & Kraus, LLP.

(57) ABSTRACT

Provided is a recording and retrieval apparatus for a multi-layer optical disk. A multi-layer optical disk in which a plurality of recording layers and a single servo layer are combined to form a set is used. A spot for the servo layer and a spot for the recording layers are turned on in a time-sharing manner. Servo signal detection areas are formed discretely in the servo layer. The servo signal detection areas and data recording areas are provided so as not to overlap each other when viewed from the spot incident side. Thus, separation of data from each of the layers can be done by even a single photodetector without interference.

20 Claims, 15 Drawing Sheets

FIG. 6
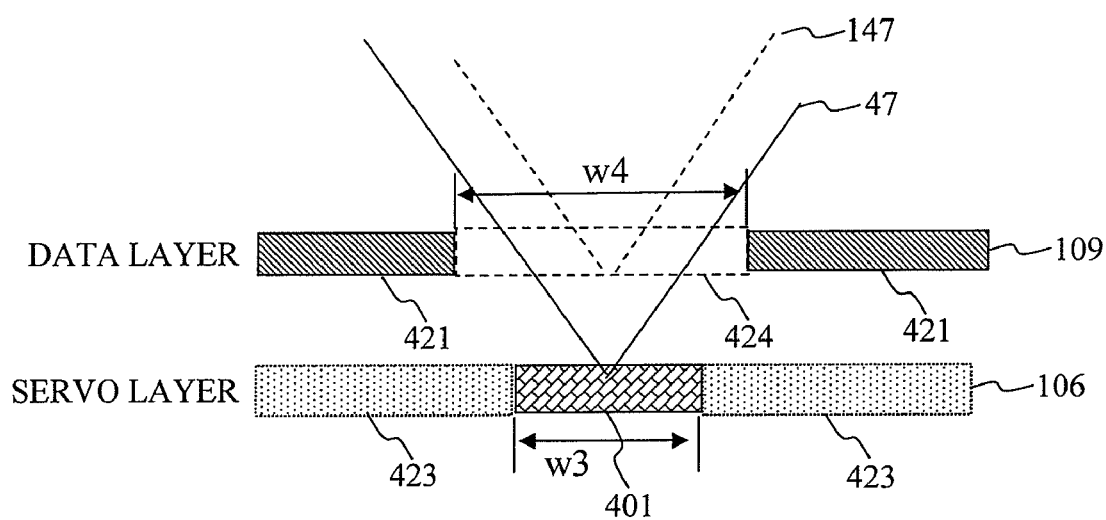
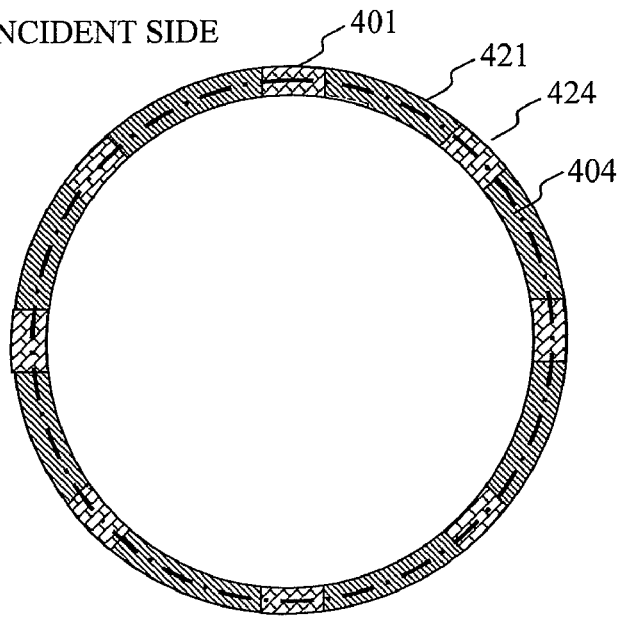
VIEWING FROM LIGHT INCIDENT SIDE

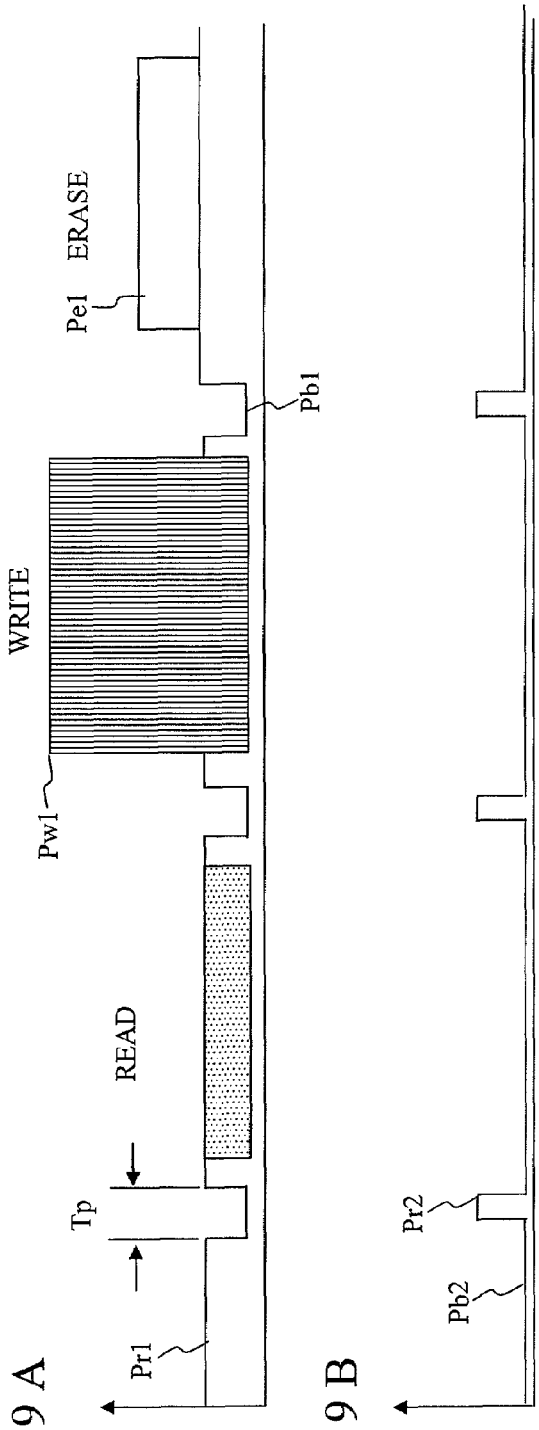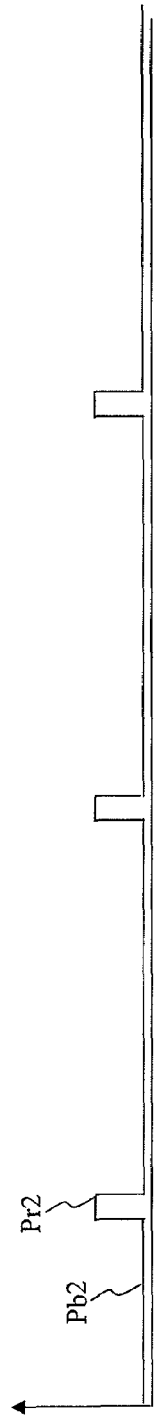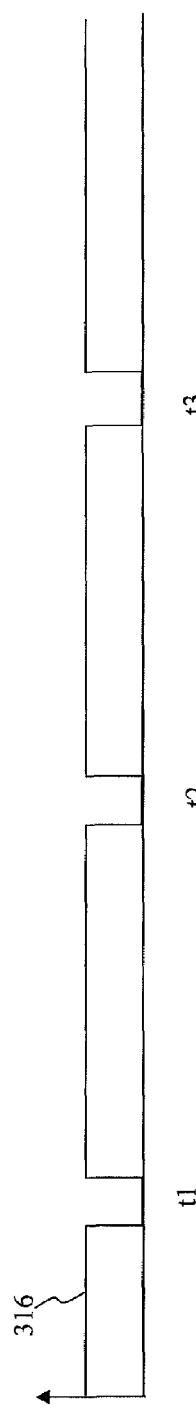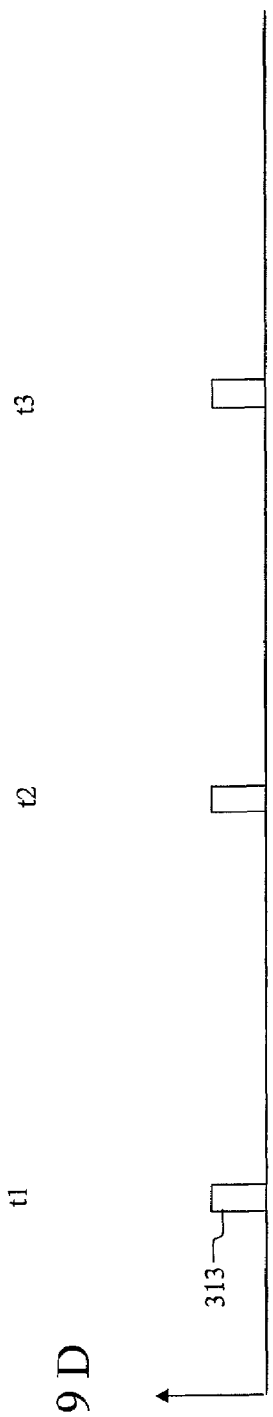

INFORMATION RECORDING AND RETRIEVAL METHOD, AND ITS APPARATUS

CLAIM OF PRIORITY

The present application claims priority from Japanese application JP 2007-058024 filed on Mar. 8, 2007, the content of which is hereby incorporated by reference into this application.

BACKGROUND OF THE INVENTION

1. Field of the Invention

The present invention relates to an information recording and retrieval method for optically recording and retrieving information in recording media, and also relates to an information recording and retrieval apparatus.

2. Description of the Related Art

Optical disks have the following prominent features. Semiconductor lasers can be used as a light source. Recording media (disks) can be removed from the recording and retrieval apparatus. Optical disks cost lower per bit of the recording media. Accordingly, a desirable optical disk apparatus is a higher-density, higher-speed one that still has the above-mentioned features. Conventionally, an optical disk has a single recording layer, but, to record a larger-volume data, double-layer, triple-layer optical disks have been developed. The number of recording layers has reached eight for a read-only type multiple-layer optical disk. As other types of multiple-layer recording media, a data-recordable type optical disk is disclosed. In this type of optical disk, a plurality of data-recording layers and a single servo layer are combined, and light sources are provided respectively for recording data purpose and for servo purpose. The light beams eradiated from the light source for servo form a minute beam spot on the servo layer, and always following the track formed in the surface of servo layer. The light beams eradiated from the light source for data recording maintain a constant geometrical arrangement relationship with the beam spot formed in the servo layer, and thus data is recorded in a plurality of recording layers. The retrieval of data from each of the layers is carried out by moving the spot for retrieving data in the vertical direction of the disk, and by detecting the signal in the data layer while the cross-talk from other layers is reduced by use of a pinhole (U.S. Pat. No. 6,540,397).

SUMMARY OF THE INVENTION

In a multi-layer optical disk, recording layers and intermediate layers are alternately laminated. When each recording layer and each intermediate layer have different refraction indices, multiple reflections occur at boundary surface. While the light beam reflected from the target data layer is focused on a spot on the photodetector surface, the multiple reflected light beams from other data layers are also focused on the same spot, which results in a difficulty in separating the signal of the target data layer from multiple reflected light beams of other layers. In addition, detecting a track error signal and a focus error signal needs a plurality of photodetectors placed at positions deviated from the converging spot of the reflected light beam, and also needs a detection of the balance between the quantities of light that the photodetectors received. The structure of this photodetector, however, needs another separation method because light beams from other layers get mixed again.

A wider interval between layers helps separating reflected lights from the respective layers even with a photodetector with a certain dimensions and thus helps reduce layer crosstalk. The interval between layers has to be made narrower to achieve a larger recording capacity for multi-layer optical disks in the future. This results in a difficulty in separating reflected light beams of the respective layers. A method, therefore, is needed to retrieve only the information of the desired layer among all the received light beams reflected from layers.

To meet the demand, the present invention provides an information recording and retrieval method, and an information recording and retrieval apparatus for a multi-layer optical disk.

In the present invention, using a multi-layer optical disk into which a plurality of recording layers and a single servo layer are combined, and a light-beam spot is eradiated to the servo layer and a selected one of the recording layers in a time-sharing manner. While following a desired track is carried out by acquiring servo information from the servo layer, the recording data in and retrieving data from the recording layer are carried out.

In a multi-layer optical disk according to an aspect of the present invention, a plurality of recording layers and a single servo layer are combined to form a set. In the servo layer, servo areas for detecting a track error signal and a focus error signal are formed discretely along a track, and in the recording layer, non-recording areas are formed discretely. Non-recording areas in the recording layer and servo areas in the servo layer are arranged so as to overlap each other when viewed from the light incident side. In a case where the servo layer is positioned farther than the plurality of recording layers when viewed form the light incident side, non-recording areas in the recording layer are transparent areas. Alternatively, in a case where servo layer is positioned nearer than the plurality of recording layers when viewed form the light incident side, the servo layer, except for the servo areas, are transparent.

An information recording and retrieval method according to an aspect of the present invention uses the above-described multi-layer optical disk. The method includes a step of making a first laser beam and a second laser beam enter a multi-layer optical disk along the optical axis of a single objective lens, and then making the beams converge at respective positions, which are different from each other, on the optical axis. Also included are a step of detecting the first laser beam interacting with the servo layer, a step of generating a sampling logic signal from a first laser beam detection signal, a step of alternately turning on the first laser beam and the second laser beam in accordance with the sampling logic signal, a step of deriving a track error signal and a focus error signal for the servo layer while the first laser beam is turned on, a step of controlling the relative position of the objective lens to the multi-layer optical disk using the track error signal and the focus error signal, and then making the spot of the first laser beam follow a desired track in the servo layer, a step of detecting the second laser beam interacting with one of the plurality of recording layers while the second laser beam is turned on, and then deriving a focus error signal of the second laser beam for the recording layer, and a step of focusing the spot of the second laser beam on the recording layer using the focus error signal of the second laser beam.

An information recording and retrieval apparatus of an aspect of the present invention uses the above-mentioned multi-layer optical disk. The apparatus includes a first laser beam generating means, and a second laser beam generating means. The apparatus also includes an optical system for linking the first laser beam and the second laser beam on a single axis. Also included is an objective lens for converging the linked first laser beam onto the servo layer, and for converging the second laser beam onto one of the plurality of recording layers. In addition, the apparatus includes an actuator for driving the objective lens, a photodetector having a focus error detector and a track error detector, and a timing generation circuit for generating a timing signal for eradiating alternately the first laser beam and the second laser beam in accordance with the output of the track error detector. Moreover, the apparatus includes a first focus servo block for driving the actuator in the optical axis direction in accordance with the output of the track error detector while the first laser beam is turned on, and a tracking servo block for driving the actuator in a direction perpendicular to the optical axis in accordance with the output while the first laser beam is turned on. Furthermore the apparatus includes a second focus servo block for driving the spot of the second laser beam in the optical axis direction in accordance with the output of the focus detector while the second laser beam is turned on.

According to the present invention, use of two light-beam spots enables a single photodetector to detect signals from a plurality of recording layers in a multi-layer optical disk.

BRIEF DESCRIPTION OF THE DRAWINGS

FIG. 6 describes a servo layer and a recording layer of multi-layer optical disk according to the embodiment of the present invention.

FIG. 9 describes a principle of a recording and retrieving method for a multi-layer optical disk according to the embodiment of the present invention.

DESCRIPTION OF THE PREFERRED EMBODIMENTS

Figure 1:
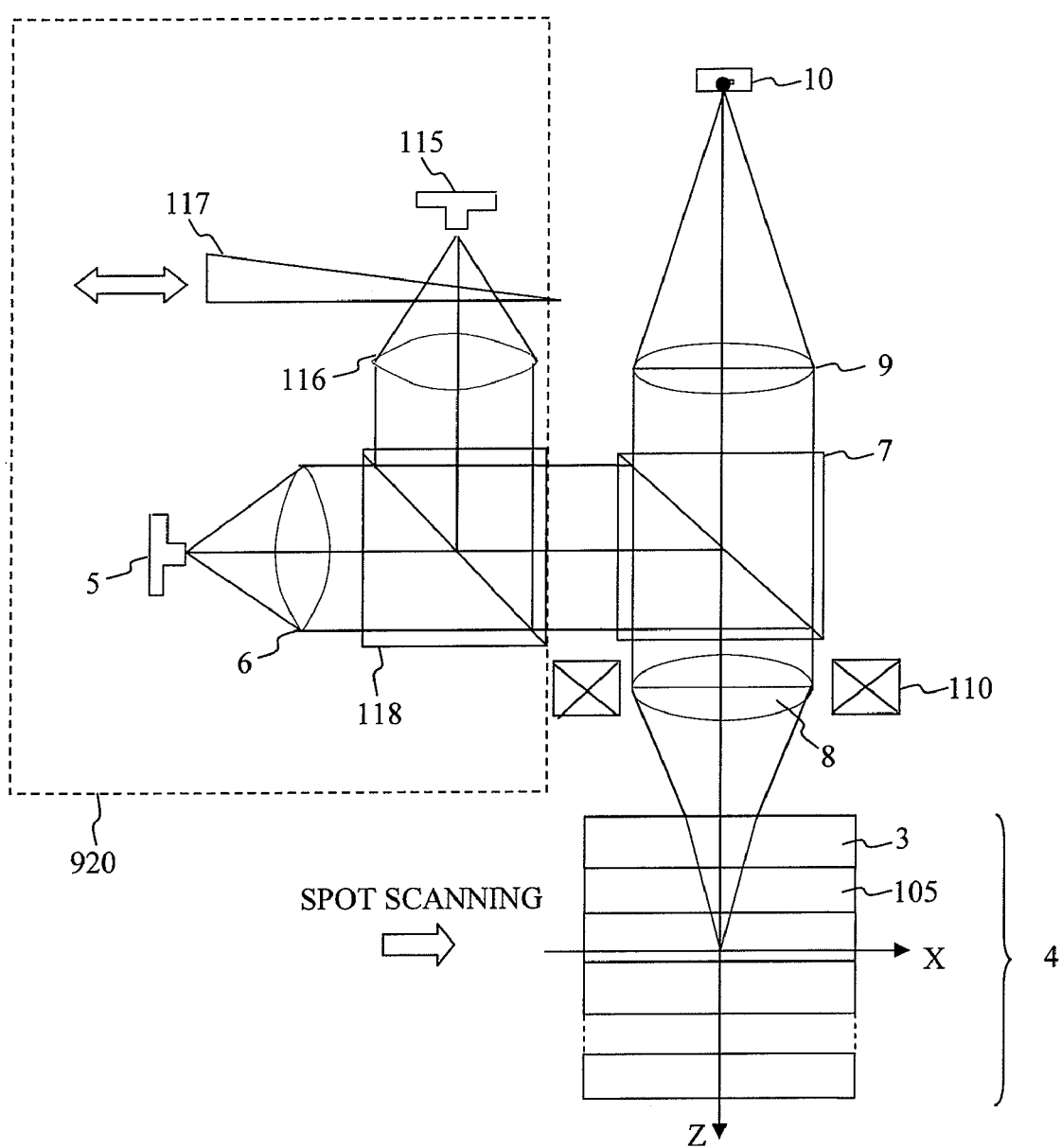
FIG. 1 shows a configuration example of a three-dimensional recording and retrieval apparatus according to an embodiment of the present invention.

Hereinbelow, embodiments of the present invention will be described with reference to the accompanying drawings. FIG. 1 shows a configuration example of a three-dimensional recording and retrieval apparatus according to an embodiment of the present invention. The detection optics employed in this embodiment are reflective light optics, but transparent light optics may replace the reflective light optics. A multi-layer optical disk 4 has a structure. Specifically, on a transparent substrate 3, recording layers 1 and intermediate layers 2 (see FIG. 2A) are alternately laminated into a multiple layered structure. A local eradiation of a light beam brings about a local change in optical characteristics of each of the recording layers 1 to enable the recording of data in the recording layers 1. The intermediate layers 2, to support the recording layers are provided for the purpose of antireflection, protection against multiple reflections, light absorption, transfer of local optical change on recording layer, heat insulation, heat absorption, heat generation and reinforcement. When data is recorded, a light beam spot is focused on a desired one of the recording layers of the multi-layer optical disk 4, and thus local optical characteristics of the desired recording layer are changed two-dimensionally and independently of the other recording layers. In this way, the recording corresponding to the data after the modulation, that is, data consisting of "1" and "0". When data is retrieved, a light-beam spot is eradiated to a desired one of the recording layer and the local changes in the optical characteristics of the desired recording layer 1 are detected as the change in the quantity of the reflected light.

Included in this optical system are two light sources such as a semiconductor laser 5 and a semiconductor laser 115. In focusing optics, a collimator lens 6 converts the light beam emitted from the semiconductor laser 5 into a parallel light beam, which then passes through a polarized beam splitter 7 and enters objective lens 8. A light beam reflected from the disk 4 passes through the objective lens 8, and is then led to an image lens 9 for detection by the beam splitter 7. A photodetector 10, which is provided at a position close to the focal point of the lens 9, converts the change in the quantity of the reflected light into an electrical signal.

FIGS. 2A and 2B show a possible structure of the multi-layer optical disk 4. FIG. 2A shows that a single servo layer 106 is provided for every M layers of recording layers R1 to RM, which are made into a set. FIG. 2B shows that the multi-layer disk has a structure separated into a plurality of the sets 500, 501, 502 . . . , specifically, separated into N sets. Onto the servo layer, a light beam 47 from the semiconductor laser 5 is converged by the objective lens 8, and thus a minute spot 108 is formed on the layer. Meanwhile, onto one of the recording layer 1, a light beam 147 from the semiconductor laser 115 is converged by the objective lens (focusing lens) 8, and thus, a minute spot 107 is formed on the layer. When data is recorded or retrieved, the spot 108 of the light beam 47 from the semiconductor laser 5 always needs to be focused onto the servo layer 106. To this end, the positioning of the objective lens 8 is carried out by driving the objective lens 8 in the z-axis direction. In addition, as will be described later, a track for guiding the spot 108 is formed in servo layer, and the objective lens 8 is driven by a two-dimensional actuator 110 in the radial direction of the disk for following the track. Accordingly, the light beam 147 from the semiconductor laser 115, which beam 147 enters the objective lens 8 concurrently with the beam 47 from the semiconductor laser 5, is also driven, and thus the spot 107 is moved as following the disk eccentricity synchronously with the spot 108.

The light beam 47, which is the light eradiated from the semiconductor laser 5, is used to read data from one of the servo layers 106. The light eradiated from the second semiconductor laser 115 passes through a wedge glass plate 117, and is converted into a parallel light beam by a collimator lens 116. The light path of the resultant parallel beam is bent by a combining prism 118 towards the polarizing prism 7, then the bent parallel beam is synthesized with the light eradiated from the semiconductor laser 5, and then the synthesized light beam goes to the objective lens 8. Adjusting the amount of insertion of the wedge glass plate 117 allows the light beam to be focused on a recording layer 109, one of the M recording layers 1 of the set corresponding to the selected one of the servo layers 106.

Figure 3:
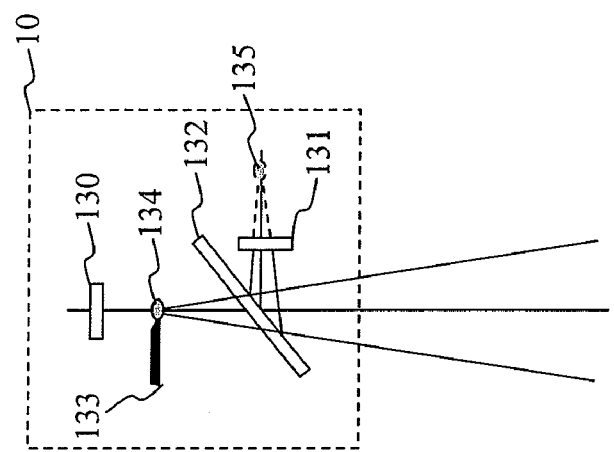
FIG. 3 describes a detection optical system for the multi-layer optical disk.
Figure 3:
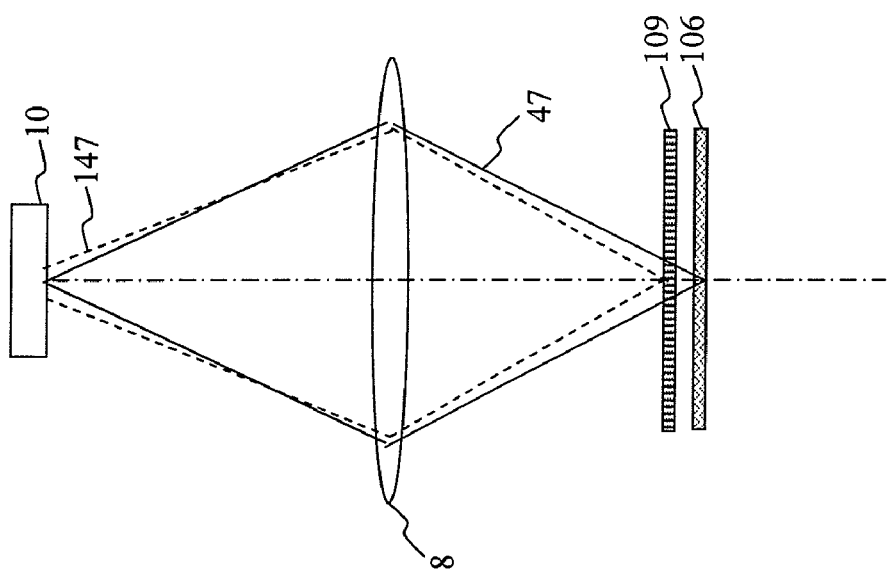

The light beam 147 reflected from the recording layer, passing through the objective lens 8, as FIG. 3A shows, enters the photodetector 10, which also receives the light beam 47 reflected from the servo layer. FIG. 3B shows an example of the detailed structure of the photodetector 10. The light beam reflected from the multi-layer disk is split into two light beams by a half mirror 132. A first one of the light beams transmits through the half mirror 132, and is converged into an optimum focal point 134. An edge of a knife edge 133 is located at the focal point 134. The light shut in by the edge of the knife edge 133 reaches a two-part divided detector 130. When the spot on the layer of the disk is deviated from the optimum focal point, the converging point of the light beam from the optimum focal point 134 moves up and down on the optical axis. Half of the light beam is shut in by the knife edge 133. The distribution of the transmitted light is different between the part infront of the focal point 134 and the part behind the focal point 134 because the right half of the light beam is transmitted to one of the two parts while the left half of the light beam is transmitted to the other of the two parts. The two-part divided detector 130 detects the difference as a focus error. This method of focus detection using a detection optical system is called a knife-edge detection method, and is a well-known method. The second one of the split light beams is reflected by the half mirror 132, and is converged onto an optimum focal point 135. A two-part divided detector 131, which is placed on the way, detects the distribution of light intensities for the light beam. A guiding track is formed in the disk surface onto which the light-beam spot is converged. The two-part divided detector 131 detects the change in the distribution of the reflected diffraction light in response to the deviation of the light-beam spot from the center of the track. A method of track error detection by these detection systems is called diffraction track error detection, and is a well-known method. See, for example, Kenjiro Sakurai ed., Jitsuyou Laser Gijyutsu (Practical Laser Technology), Denki Tsushin Gakkai (Institute of Electronics and Communication Engineer), pp. 92-97. Various methods are known for the detection of focus errors and of track error, and the configuration of the present invention is applicable to any of these methods.

Hereinbelow, a detailed description will be given of a method of recording and retrieving data by focusing the spot 107 of the light beam 147 from the semiconductor laser 115 on a desired one of the recording layers.

Example 1

Now, a description will be given of a first example of the present invention. FIG. 9 describes the principle of operation for recording data in and retrieving data from a multi-layer disk according to this example. The recording and retrieving operation in the recording layer will be described in terms of the behavior of the eradiate intensity of the semiconductor laser.

When data is retrieved, a laser beam of a read-power level $Pr1$ is eradiated onto a certain recording layer of the multi-layer disk. When data is recorded, the write-power level $Pw1$, which is larger than the level $Pr1$ for the reading, is needed. Another level of power $Pe1$ is needed to erase data in a rewritable type medium. In other words, the power varies for each operation mode as FIG. 9A shows. Accordingly, in this example, the eradiation onto the servo layer is shifted from the timing of the eradition onto the recording layer, and thus the signals from the respective layers are separated by a single photodetector.

Specifically, as FIG. 9A shows, the unit for recording data is made to be a block unit for each certain amount of data, and a pause interval Tp is provided between every two blocks. During this interval, the eradiation onto the recording layer is carried out with a minute power level of $Pb1$, and the eradiation onto the servo layer is carried out with a power level of $Pr2$. On the other hand, during the recording and retrieving operation of the recording layer, the eradiation onto the servo layer is carried out with a power level that is lowered to the minute level of $Pb2$. Making the timing for the eradiation onto the recording layer different from the timing for the eradiation onto the servo layer enables a single detector to detect the signals as separated from each other. In other words, each one of the signals does not affect the other signal when the signals are detected.

Figure 10:
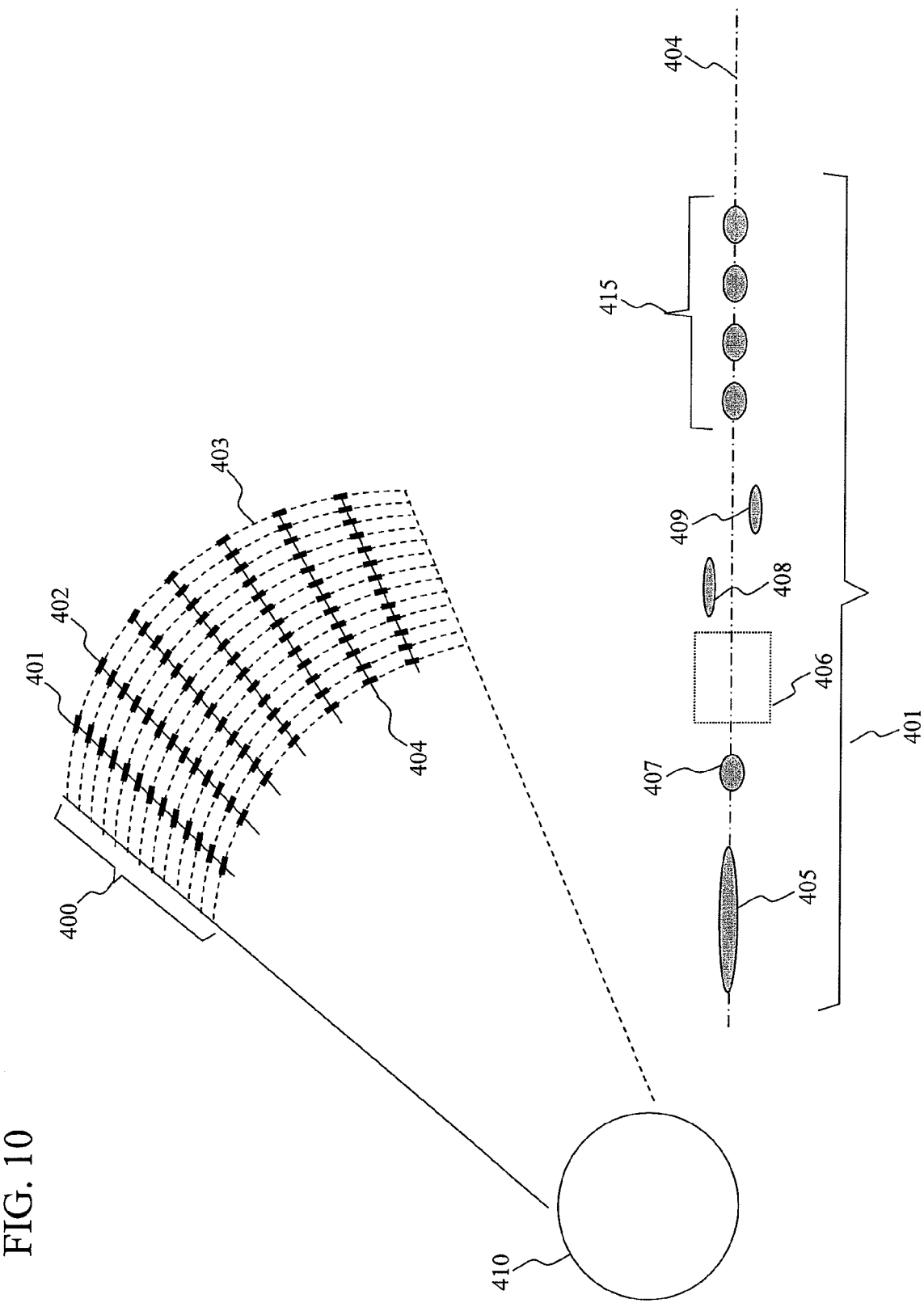
FIG. 10 shows a configuration example of a servo track formed in the servo layer.

FIG. 10 shows a configuration example of a servo track formed in the servo layer to accomplish the way of detecting signals in the above-described manner. A plurality of concentric tracks 403 are formed in the servo layer from an inner radius 410 of the disk to an outer radius thereof. On the circumference of each track, control signal detect areas (servo areas) 401, 402 are provided equidistantly. Provided to each servo area are a mark 405, which is indicative of the beginning of the servo area, then a clock mark 407 for generating a clock, and then a focus-error-detection area 406, which is reserved for detecting a focus error, and which has no mark. A pair of track-error-detection marks 408 and 409 follows the area 406. The marks 408 and 409 are placed, as being offset from each other in the radial direction of the track, respectively on a right and a left sides of a track center 404. Note that areas 401 are arranged on a radius line of the tracks while a certain number of tracks are made to constitute a single set 400. Then, address mark group 415 indicative of address information follows the marks 408 and 409. Use of a pair of track-error-detection mark 408 and 409, and of a clock mark 407 for tracking is known as sampled servo. See, for example, Japanese Patent No. 3166329 and Japanese Patent Laid-open Publication No. Hei7-21879. The recording areas of the recording layer are located at the same circumference positions, in the two-dimensional plane direction, as the areas of the servo layer other than the control signal detect areas 401, 402 are located, and are located, in the vertical direction, over and under the servo layer.

Figure 11:
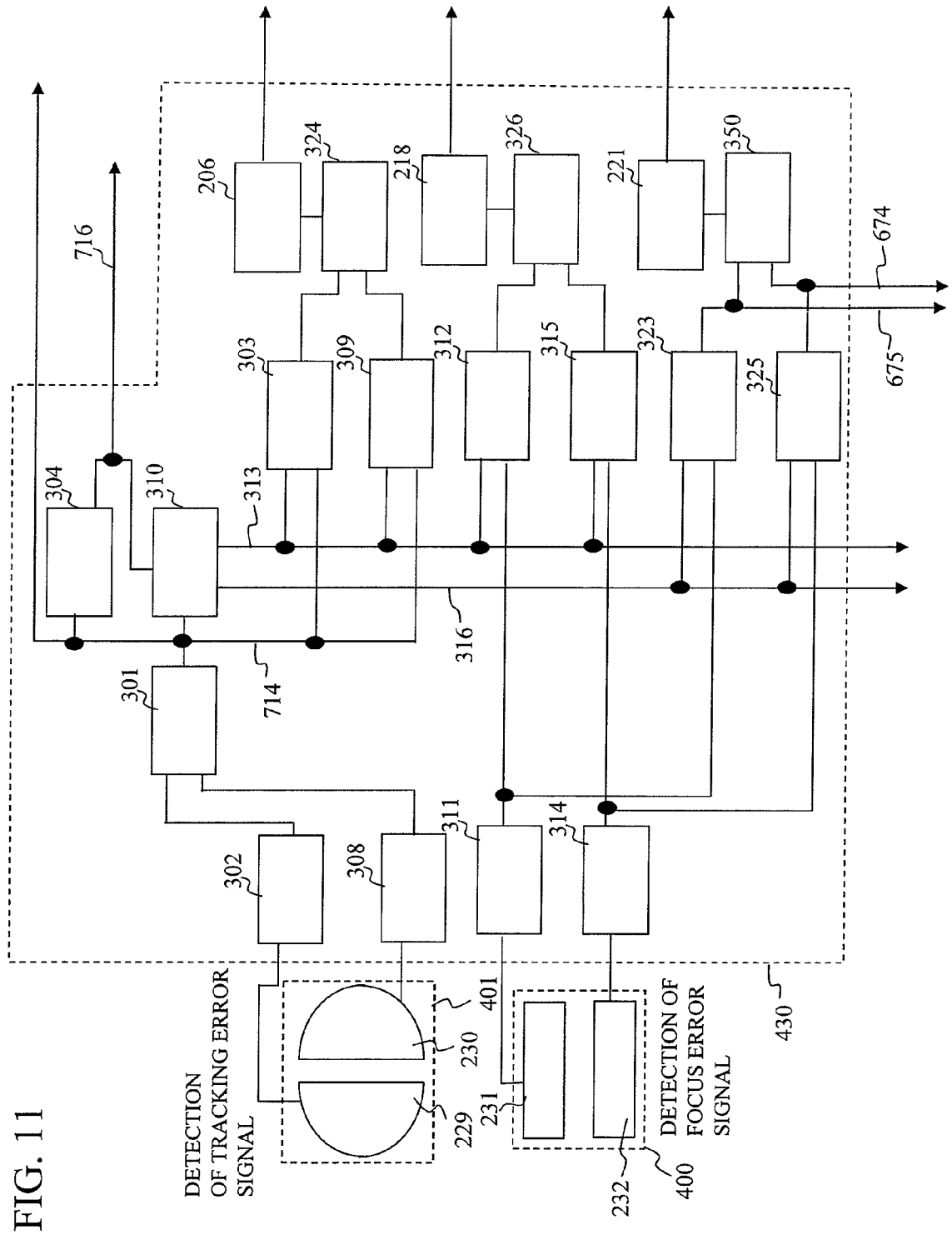
FIG. 11 shows a detailed configuration of a recording and retrieving circuit system for a multi-layer optical disk according to a first example of the embodiment of the present invention.
Figure 12:
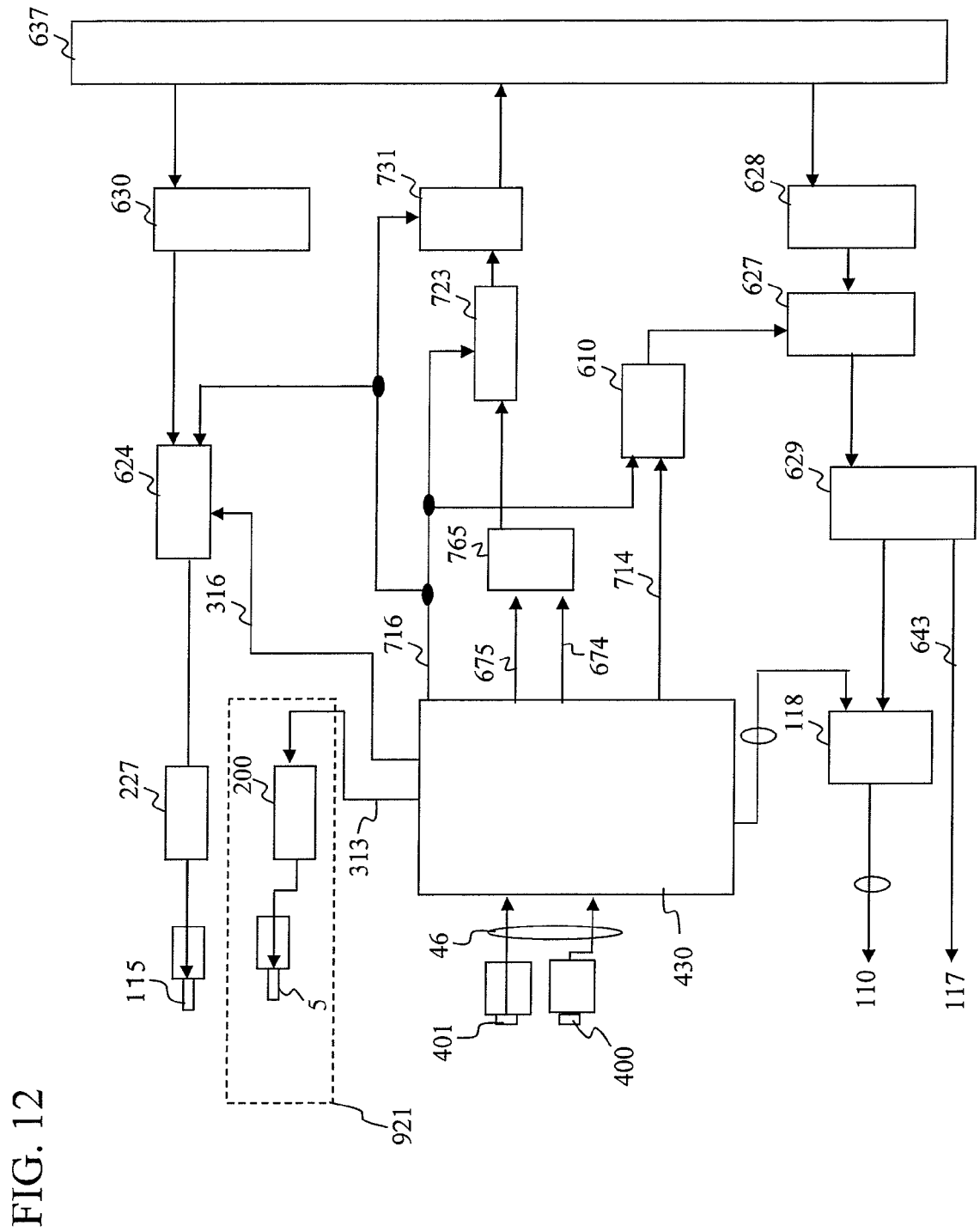
FIG. 12 shows an entire configuration of a recording and retrieving circuit system.

FIG. 11 shows a detailed configuration of a part of a recording and retrieving circuit system for a multi-layer optical disk according to this example of the present invention. FIG. 12 shows an entire configuration of the recording and retrieving circuit system. A description will be given of the operation of the recording and retrieving circuit for a multi-layer optical disk according to this example with reference to FIG. 11 and FIG. 12.

The light current detected by two-part divided detectors 229 and 230 for detecting track error signals is converted into a voltage by opto-electrical converters 302 and 308, and then is made into a signal 714 indicative of the total detection light intensity by an addition circuit 301. The signal is inputted into a clock generation circuit 304 and a timing generation circuit 310. As the first operation, the disk runs out in the direction of optical axis, and thus the spot passes through the recording layer and the servo layer. In this process, firstly, the clock generation circuit 304 detects the mark 405, while taking advantage of the length of the mark 405, which length is longer than the lengths of other marks in the control signal area and of marks indicating the data recorded in the information layer. Secondly, a focus control is carried out by sampling the focus error signal in the focus-error-detection area 406 that is located a certain time after the mark 405, and thus the spot is positioned in the servo layer. Thirdly, using the track-error-detection marks 408 and 409, which are located backward of the mark 405, the track error signal is sampling-detected, and thus the tracking in the servo layer is carried out. The above-described operation is carried out using circuits in a manner that follows.

In the timing generation circuit 310, sampling logic signals 316 and 313 as shown in FIGS. 9C and 9D are generated. In the clock generation circuit 304, the mark 405, indicative of the beginning of the control area, is identified in the control signal detect area 401 shown in FIG. 10. The clock mark 407 is away from the mark 405 by a certain distance, and the timing at which the clock mark 407 is generated is detected. The clock is then inputted into a phase locked loop (PLL) to generate a clock. As a method of this generation, a well-known method of signal detection of sample servo may be used. The sampling logic signals 316 and 313 are generated from the timings of this clock and of the mark 405.

The signal 714 indicative of the total detection light intensity is inputted into sampling hold circuits 303 and 309. Using sampling logic signal 313, the signal from the mark 408, shown in FIG. 10, and the signal from the mark 409, are respectively detected by the sampling hold circuits 303 and 309. The outputs of these circuits are inputted into a differential circuit 324. Then the differential is obtained, and thus the deviation of the spot 108 from the track center 404 can be detected. This track error signal is inputted into a control compensation circuit 206, and then into a terminal of the two-dimensional actuator 110 to drive the objective lens 8 in the radial direction of the disk. Thus the tracking is carried out.

The light currents from the photodetectors 231 and 232 are inputted respectively into the opto-electrical converters 311 and 314. The resultant voltages are inputted into sampling hold circuits 312, 315, 323 and 325. In the sampling hold circuits 312 and 315, only the light beam emitted from the semiconductor laser 5 and reflected from the servo layer is detected in accordance with the sampling logic signal 313. The differential is obtained from outputs of the sampling hold circuits 312 and 315 by a differential circuit 326, and thus the focus error between the servo layer and the spot 108 is detected. The resultant focus error signal is inputted into the control compensation circuit 218, and then into the terminal of two-dimensional actuator 110 to drive the objective lens 8 in the optical axis z direction. Thus the focusing onto the servo layer is carried out.

In the sampling hold circuits 323 and 325, the outputs from the opto-electrical converters 311 and 314 are sampled and held in accordance with the sampling logic signal 316. Thus, only the light beam eradiated from the semiconductor laser 115 and reflected from the recording layer is detected. The differential is obtained from the outputs of the sampling hold circuits 323 and 325 by a differential circuit 350, and thus the focus error between the recording layer and spot 107 is detected. The focus error signal is inputted into a control compensation circuit 221, and then into a terminal to drive the wedge glass plate 117 in a direction perpendicular to the optical axis. Thus, focusing onto an arbitrarily chosen one of the M recording layers is carried out.

With reference to FIG. 12, a detail description is given of the operation of the recording and retrieving circuit. The signal 714, indicative of the total quantity of light, and a clock signal 716 are inputted into a data discrimination circuit 610. In the data discrimination circuit 610, an address signal is detected from the address marks 415 shown in FIG. 10, and thus a track address is retrieved. The retrieved track address signal is inputted into an address comparison circuit 627, and is compared with the output of a register 628 of an address order from a host controller 637. Then, a circuit 629 for generating a control signal for the light-beam spot, sends a control signal for the two-dimensional actuator 110 to the driving circuit 118, and also sends a signal 643 to drive the wedge glass. The two-dimensional actuator is moved in the focusing direction, and the spot 108 is positioned in the servo layer of an arbitrarily chosen one of the N blocks. On the other hand, the wedge glass is driven to make the spot 107 be positioned in one of the M recording layers of the block layer chosen above. Thus the accessing to a desired recording layer is accomplished. Regarding the accessing within the layer, in accordance with the address information of the address mark group 415, in the servo layer, shown in FIG. 10, two-dimensional actuator 110 is moved in the track direction. Thus, the spot 108 is positioned in one of the tracks. Accordingly, the tracking direction of spot 107 is positioned as interlocked with the spot 108, and the focusing direction of the spot 107 is positioned, by the movement of the wedge glass relatively to the servo layer as the criterion.

In addition, a resister 630 receives user data that the host controller 637 sends, and the received data is stored as recording information. The recording information inputted into the modulation circuit 624 is modulated with the clock signal 716, and is further modulated with the timing signal 316 so that the recording operation can be carried out at a timing shown in FIG. 9A.

At the time of recording, the modulated signal is inputted into a laser driving circuit 227, and the light source 115 is subjected to an intensity modulation. Thus, data is recorded in a data area 421 of the recording layer. At the time of retrieving, in the data recording area, a direct-current output is inputted into the laser driving circuit, and as FIG. 9A shows, the reflected light beam is modulated with the recording data.

When the recorded data is retrieved, the spot 108 is positioned in one of the tracks in the servo layer. On the other hand, the spot 107 is positioned in one of the recording layer, in which the recording is carried out, and the spot 107 is placed in the area where the data is recorded. The reflected light beams are focused on and detected by detectors 130 and 131 on the photodetector 10. The light currents are converted into voltage by preamplifiers 302, 308, 311 and 314, and thus the servo information is detected. In addition, to retrieve data in the recording layer, output signals 675 and 674 of the sample holding circuits 325 and 323 are inputted into an addition circuit 765, and generate a signal indicative of the total detection light intensity. The resultant signal is then inputted into a data discrimination circuit 723. Into another input terminal of the data discrimination circuit 723, the clock signal 716 is inputted. Data information is detected, demodulated, and stored in a resister 731. The data information is then sent to the host controller 637. In the resister 731, in accordance with the clock signal 716, data outputted from the data discrimination circuit 723 is stored. When this data information is sent to the host controller, the data information is converted into a form of the user data.

Figure 4:
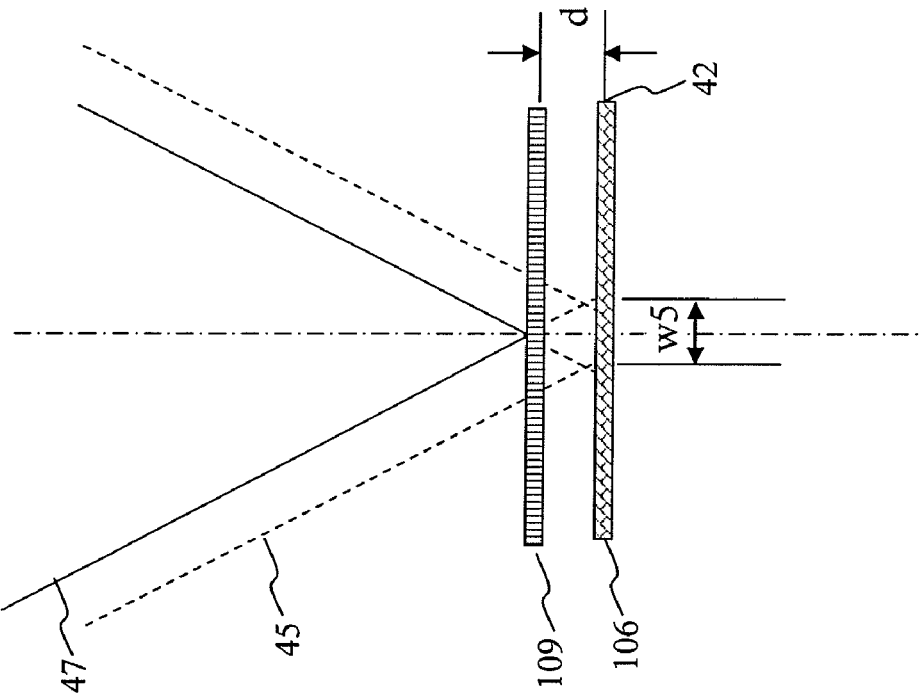
FIG. 4 describes a multiple reflections that occur in the multi-layer disk.
Figure 5:
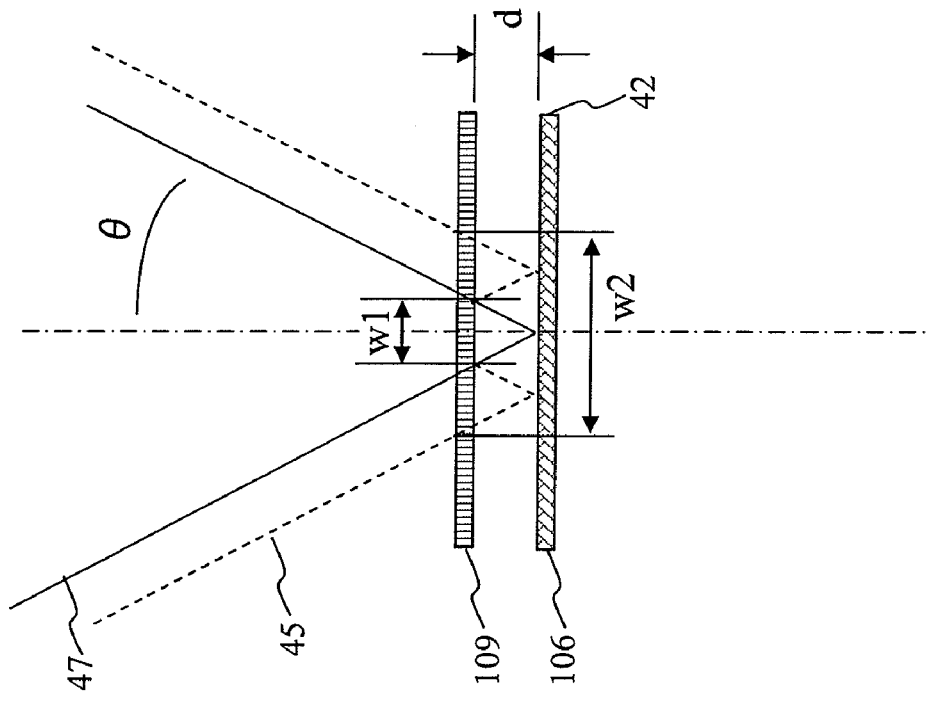
FIG. 5 describes a multiple reflections that occur in the multi-layer disk

What has been described thus far is an operation for data recording and retrieving with the following features. Specifically, the timing of eradiating the laser beam onto the servo layer is made different from the timing of eradiating the laser beam onto the data layer. This is for the purpose of solving the problem of difficulty in separating the signals from different layers. The difficulty is derived from the fact that the light beam reflected from the servo layer is positioned closer to the light beam reflected from the data layer on a surface of the photodetector. With the data layer 109 being close to the servo layer 106, as shown in FIG. 4, even when only the laser beam 47 that eradiates onto the servo layer is emitted, the beam is reflected by the data layer 109, and then reflected again by the servo layer to produce a reflected light beam 45 that goes to the objective lens 8. In this case, when the distance d between the two layers is short, the laser beam 47 and the reflected light beam 45 become inseparable on the photodetector. In addition, as FIG. 5 shows, even when the positions, viewed from the light incident side, of the data layer and of the servo layer is reversed, the transmittance of the servo layer is necessary in this structure. Consequently, the light beam transmitted through the servo layer is reflected by the data layer, and the reflected light beam 45 is focused onto the photodetector through the objective lens 8. The problem of this kind occurs not only between the servo layer and one of the data layers that is close to the servo layer. The problem also occurs between the servo layer and other data layers that form a set together with the servo layer. Nevertheless, the influence of the problem is stronger in the case where the problem occurs between the servo layer and the data layer that is close to the servo layer. Thus, proposed hereinbelow is a method for solving this problem by an improved structure of the disk.

Now, assuming that only one laser beam is emitted. A description will be given of a problem that occurs in a disk with a multiple-layer structure. Here, in the structure shown in FIG. 4, $r_s$ denotes the reflectivity of the surface of the servo layer, $r_d$ denotes the reflectivity of the surface of the data layer, $t_d$ denotes transmittance. With the incident light $I_0$, the intensity $I_s$ of the light 47 reflected from the servo layer surface is obtained by the following equation.

$$I_s = I_0 \cdot t_d^2 \cdot r_s$$

The intensity $I_m$ of the multiple reflected light 45 from the data layer and from the servo layer is obtained by the following equation.

$$I_m = I_0 \cdot t_d^2 \cdot r_d \cdot r_s$$

Incidentally, the reflected lights 45 and 47 interfere with each other on the surface of the photodetector. The amount of the interference is determined by the area where the reflected lights 45 and 47 overlap on the surface of the photodetector, the area of the photodetector that overlaps with the area that has just been mentioned, and the visibility of the reflected lights 45 and 47. In an actual optical system, the dimension of the sensor is made larger than the diffraction limit of the image-side lens 9 for the convenience of adjustment. The interference from the adjacent layer in a dual-layer structure of a disk is known as layer cross-talk, and is analyzed in "Analyses of Signals from Dual-Layer Phase Change Optical Disks" *Japan Journal of Applied Physics*, Vol. 42(2003) pp. 5624-5633 Part 1, No. 9A.

In the above-cited document, the ratio α of the quantity of light reflected from the data layer and entering the sensor to the quantity of light reflected from adjacent layers and entering the sensor is obtained on the assumption that the two layers have an equal reflectivity. The ratio α is determined by interval d between the layers, the dimension of the sensor, the numerical aperture of the objective lens and the like. Here, use of a semiconductor-laser light source makes the visible distance 1 shorter. The distance 1 becomes extremely shorter especially when a high frequency is super-imposed on the driving current to suppress the fluctuation of the oscillation light intensity, which fluctuation is caused by the light beam that returns to the laser. The distance 1 in this case is approximately several tens of micrometers, which is approximately equal to the distance d between the layers of the multiple-layered disk. Accordingly, the visibility γ, indicative of the degree of interference is given as a function of the interval d between layers.

With the phase difference δ of the optical paths of the respective reflected light beams 45 and 47, the light intensity I as a result of the interference between the two light beams 45 and 47 will be given by the following equation.

$$I = I_s + I_m + 2\sqrt{(I_s \cdot I_m)} \gamma \cos(\delta)$$
$$= I_s + \alpha \cdot r_d \cdot I_s + 2\sqrt{(I_s \cdot I_s \cdot \alpha \cdot r_d)} \gamma \cos(\delta).$$

To make other variables than $I_s$ affect less the light intensity I, the following three options are selectable:
(1) reducing $r_d$, preferably down to zero;
(2) reducing α, while effective measures to accomplishing this include:
  A making the sensor dimension smaller, and
  B widening the interval between the layers, and this widening makes the visibility γ be brought closely to zero.
(3) combining (2) B and (1) when use of (1) alone cannot make $r_d$ zero.

Next, the above result will be applied to a system in which the detection of lights is carried out with two laser beams each of which has a different timing of light emission from that of the other beam. With one of the two laser beam being used for detecting the servo signal and the other laser beam being used for reading and writing the recording data, the overlapping of the servo area and the data area when viewed from the light incident side poses no problem. Now assume, however, that the above-mentioned option (1) is applied to make the data layer 109 have no influence when only the laser beam 47 for detecting servo signal is emitted. In this case, on the data layer, the area 424 other than the data area 421 has a zero reflectivity $r_d$, and all the servo areas 401 have to be seen when viewed from the light incident side.

Now, the condition for that will be obtained using FIG. 4 and FIG. 6. The diameter w1, shown in FIG. 4, of the laser beam 47 passing through the data layer is obtained as follows.

$$w1 = 2 \cdot d \cdot \tan(\theta)$$

where θ is the incident angle. The diameter w2 of the reflected light 45, which is subjected to multiple reflections and then passes through the data layer again, is obtained as follows.

$$w2 = 3 \cdot w1 = 6 \cdot d \cdot \tan(\theta).$$

Then, with the length of the servo area 401 being w3 in FIG. 6, the length w4 of the area 424 that is not the data area is obtained as follows.

$$w4 = w3 + w2 + 2 \cdot \epsilon$$

where ε is an area that is added to eliminate the influence of the offsetted two laser beam 147 and 47.

In addition, the diameter w5, shown in FIG. 5, of the reflected light 45 passing through the servo layer 109 and then reflected by the data layer is obtained as follows.

$$w5 = 2 \cdot d \cdot \tan(\theta).$$

Then, the length w6, shown in FIG. 7, of the areas 420 that is not the data area is obtained as follows.

$$w6 = w3 + w5 + 2 \cdot \epsilon$$

where w3 is the length of the servo area 401.

What has been described thus far is summarized as follows.

(1) In a structure shown in FIG. 6 where the data layer is located on the near side when viewed from the light incident side, and the servo layer on the far side, the minute areas 424 are discretely arranged in the data layer, and the servo area 401 on the servo layer overlaps the area 424. With this arrangement and, preferably, with the reflectivity $r_d$ being selected to be low, the quantity of light of the laser beam passing through the minute area 424 decreases after the multiple reflections, and, after that, only the light reflected from the servo area enter the photodetector. Note that the minute area 424 and the area 423 which is located on the servo layer, and which is not the servo area, are desirably also transparent.

Figure 7:
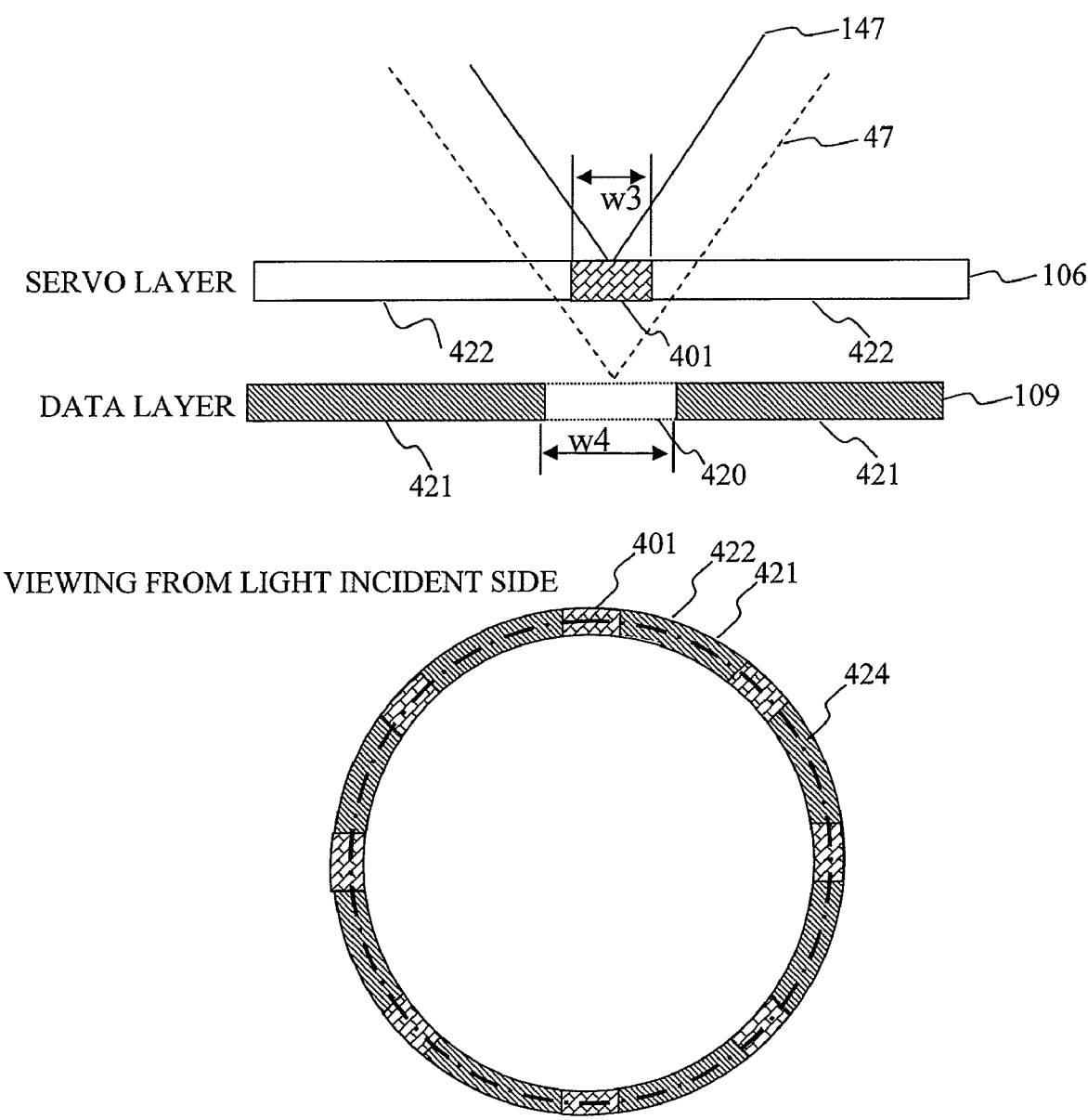
FIG. 7 describes the servo layer and the recording layer of multi-layer optical disk according to the embodiment of the present invention.

(2) In a structure shown in FIG. 7 where the servo layer is located on the near side when viewed from the light incident side, and the data layer on the far side, the servo areas 401, as minute areas, are arranged discretely along the tracks, and the transmittance of the other areas 422 of the servo layer is increased. In the data layer 109, the data is recorded in the areas 421 that do not overlap the servo areas 401 when viewed form the light incident side. In other words, non-recording areas 420 are made to overlap the servo areas 401 when viewed from the light incident side.

Example 2

Figure 8:
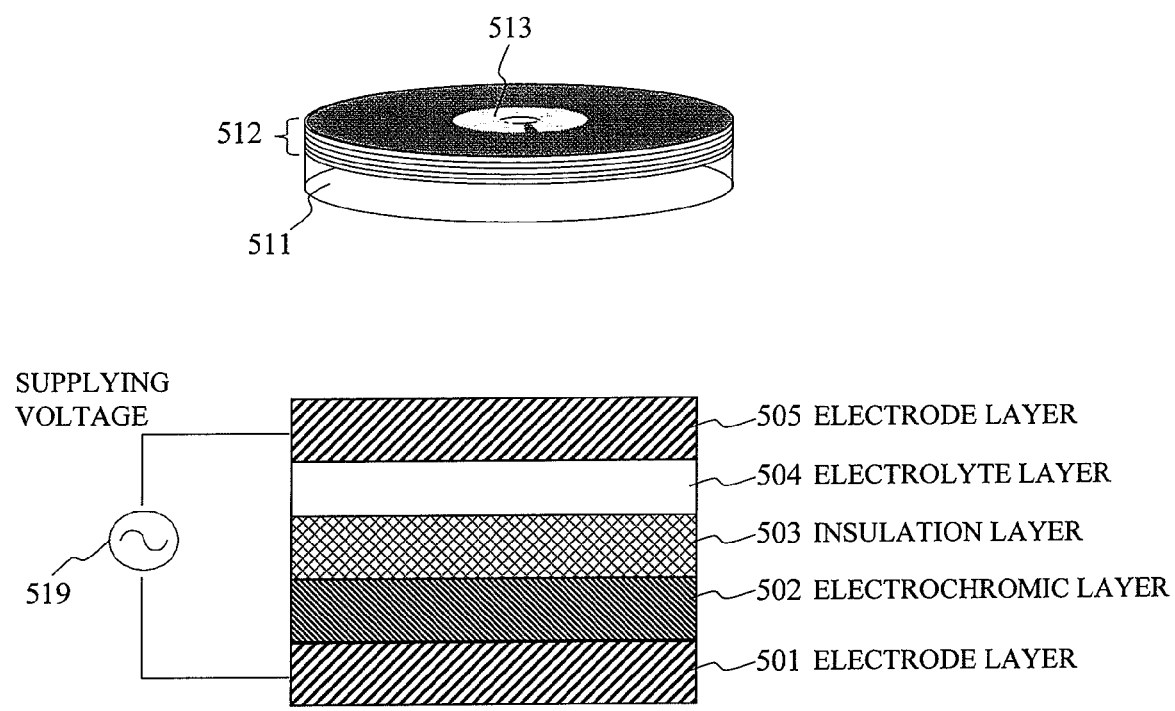
FIG. 8 describes a multi-layer optical disk of a recording-layer selective type.

Incidentally, when data is recorded in a layer located on far side in a multi-layer disk, the layer located on the near side tends to affect the recording. This is a problem that derives from the principle of the recording in a multi-layer disk. Then, a method in which one of the recording layers is electrically selected is disclosed in Japanese Patent Application Laid-open Publication No. 2003-346378, The outline of the method will be described with reference to FIG. 8. A laminated disk 512, in which a plurality of layers are laminated on a substrate 511, is fabricated. Now, a detailed description will be given of one of the recording layers of the laminated disk. A layer 502 where data is actually recorded is made of an electrochromic material (hereinbelow, referred to as an electrochromic layer 502). An insulation layer 503, which is adjacent to the electrochromic layer 502, and an electrolyte layer 504 are laminated. Electrode layers 501 and 505 are respectively located on the lower and the upper side of the above-mentioned laminated layers, that is, the electrochromic layer 502, the insulation layer 503, and the electrolyte layer 504. When a voltage is applied to the electrode layers 501 and 505 by a voltage application circuit 519, a separation of ions and electrons occurs in the electrolyte layer 504. The ions pass through the insulation layer 503, and move to the electrochromic layer 502. Thus, the electrochromic layer 502 is colored. A reversal of the applied voltage makes the ions that have moved to the electrochromic layer 502 return to the electrolyte layer 504. Thus, the electrochromic layer 502 is decolored and becomes transparent.

Figure 13:
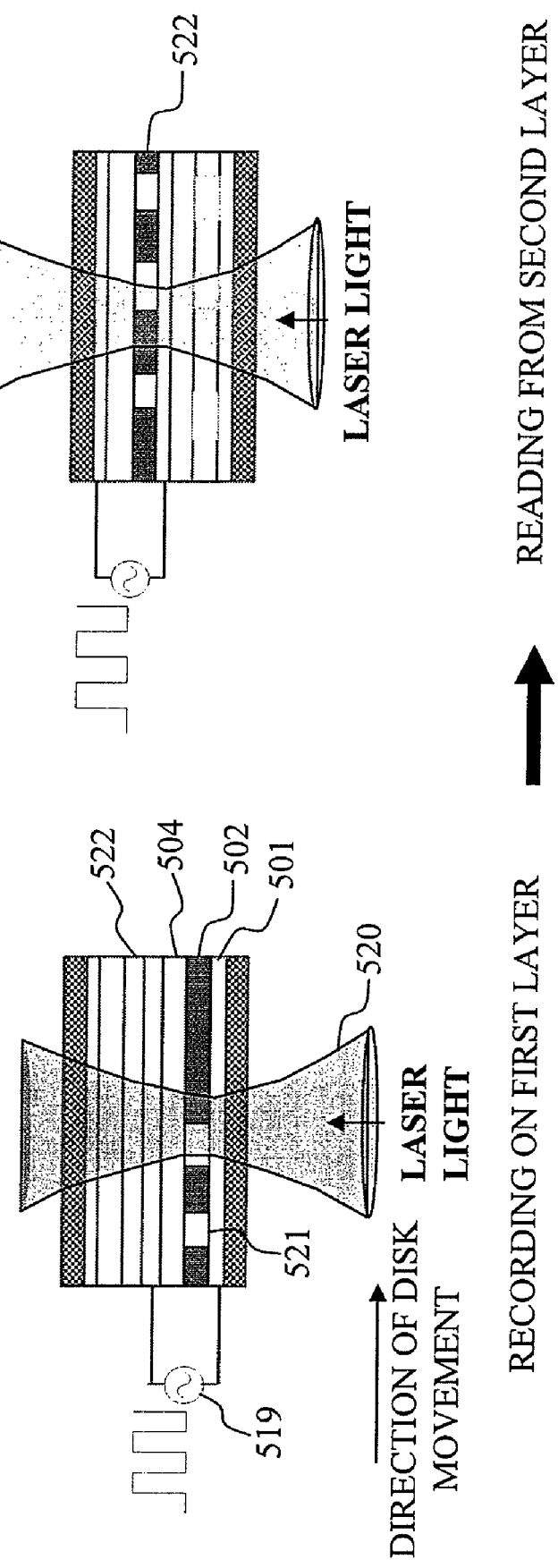
FIG. 13 describes a principle of recording and retrieving a multi-layer optical disk of a recording-layer selective type.

A detailed description will be given of the recording and retrieving operation in the disk that has the above-described structure with reference to FIG. 13. When recording in the first electrochromic layer 502 is carried out, a voltage is applied to the electrode layers 501 and 505 by the voltage application circuit 519 to color the electrochromic layer 502. A laser beam 520 is focused on the electrochromic layer 502. When a data mark is recorded, the laser intensity is modulated to increase the temperature. Thus, the materials of the electrochromic layer 502 are changed to form a transparent recording mark 521. Following a similar procedure to the one that have just been described, a transparent recording mark is formulated in a second electrochromic layer 522. When the retrieving of the mark in the second layer is carried out, a voltage is applied to the electrode layers of the second layer to color the electrochromic layer. The portion of the recording mark is transparent, so that, in the electrochromic layer, the quantity of the reflected light from the portion without the mark, is larger than the corresponding quantity from the portion with the mark. When the reflected light intensity is converted into an electrical signal, the mark can be detected by an ordinary signal processing. Here, in the first layer in a state where no voltage is applied, the portion with a mark and the portion without a mark are made to have an equal transmittance. Accordingly, even in a multi-layer-structure disk, the layer located on the near side when viewed from the light incident side does not affect the recording and retrieving of data in a layer located on the far side. Thus, a reliable operation of the recording and retrieving of data is accomplished. In addition, the number of layers of the multi-layer disk can be increased, and the capacity of each disk can also be increased.

Figure 2:
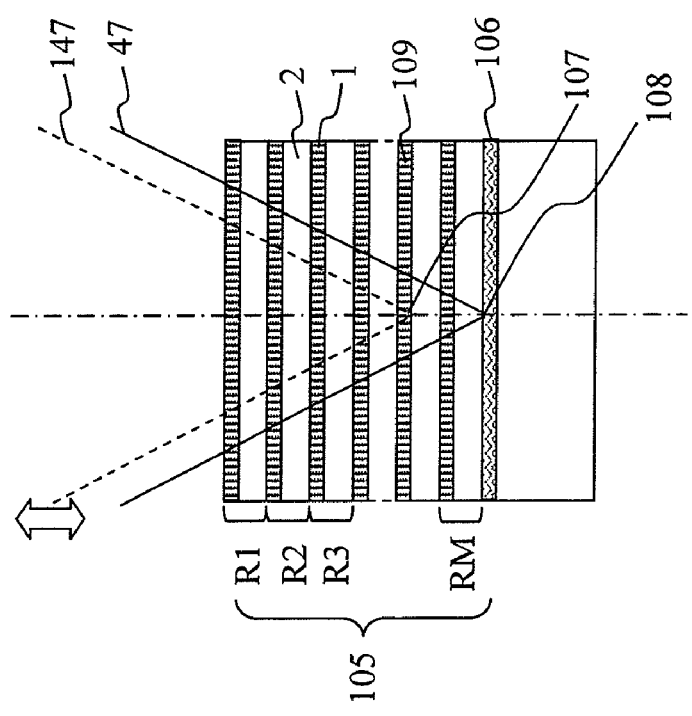
FIG. 2 shows a configuration example of a multi-layer optical disk according to the embodiment of the present invention.
Figure 2:
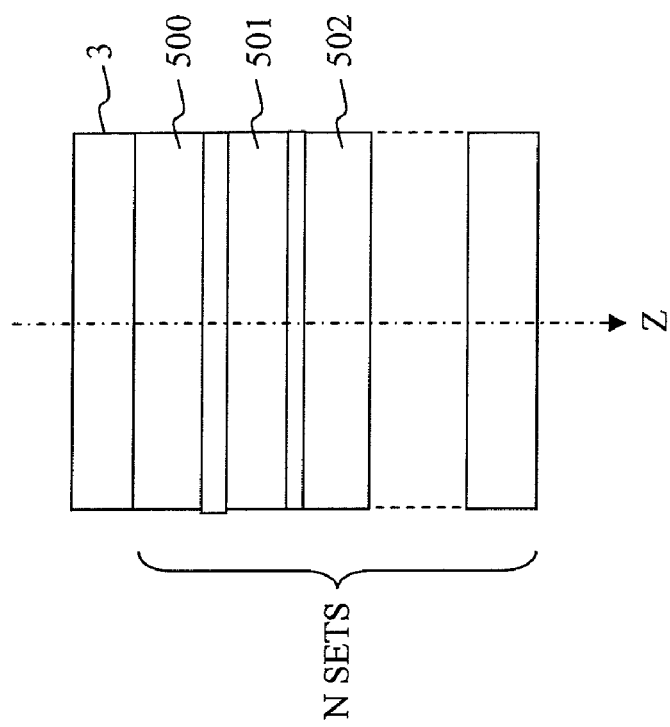
Figure 14:
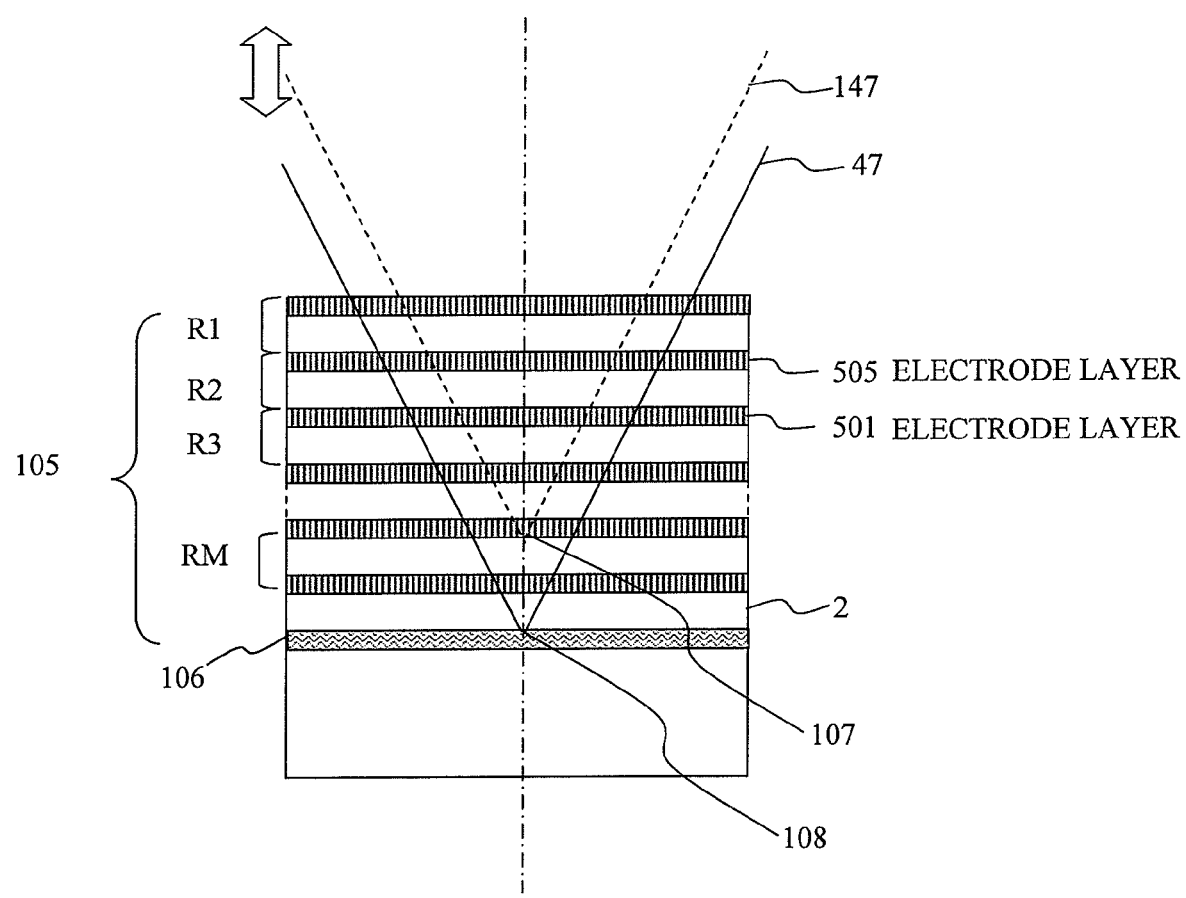
FIG. 14 describes a multi-layer optical disk of a recording-layer selective type according to an embodiment of the present invention.

The disk structure with the above-described recording and retrieving principle is applied to the present invention, so that each one of the sets in the multi-layer disk shown in FIG. 2 has a structure shown in FIG. 14. Each set 105 of the multi-layer disk includes M electrochromic layers and a single servo layer 106. Each electrochromic layer, the insulation layer, and the electrolyte layer are held between the electrode layers 505 and 501, and these layers are laminated together.

When the recording and retrieving is carried out, a layer to be subjected to recording and retrieving operation is selected from the recording layers R1 to RM using the signal 643 shown in FIG. 12, for driving the wedge glass. With the signal 643, a voltage is applied to electrode layers (for example, electrode layers 505 and 501) that sandwitch the desired recording layer and thus the layer where the recording and retrieving is carried out is selected.

When the areas 420 are created in accordance with the above-described principle, a recording power equivalent to the power for recording data is eradiated only to the area to be the areas 420 for a certain period of time (the period is determined by the linear velocity corresponding to the areas 420). Thus the areas 420 are made substantially transparent, like the recording mark. As a method of actually recording the areas 420, the way of recording the data described in Example 1 is applicable. Specifically, the areas 420 are recorded using the servo layer as a guide, after the manufacturing of multi-layer disk and before the shipment. In this case, the creation of the areas 420 is carried out in order beginning from the lowest recording layer of the lowest set. Thus, the recording layers located above the layer where the areas 420 are being created do not negatively affect the creation of the areas 420. The recording of the areas 420 can be carried out stably. Note that, though it is time-consuming, the areas 420 can be created on the user's side following the above-described procedure. The user creates the areas 420, using a recording and retrieval apparatus of the user, before the multi-layer disk starts to be used. In addition, the order of recording in each set may be determined to start from the lowest layer, and data and the recording areas 420 may be recorded simultaneously. In this case the time needed for the creation of recording areas 420 that is carried out in advance can be shortened.

Example 3

Figure 15:
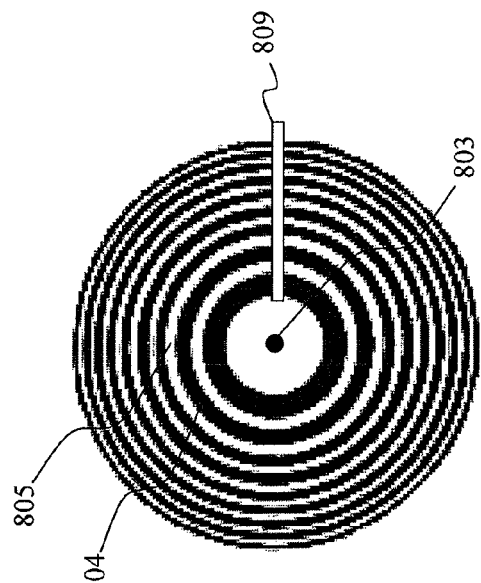
FIG. 15 describes a principle of a liquid-crystal driving method according to an embodiment of the present invention.
Figure 15:
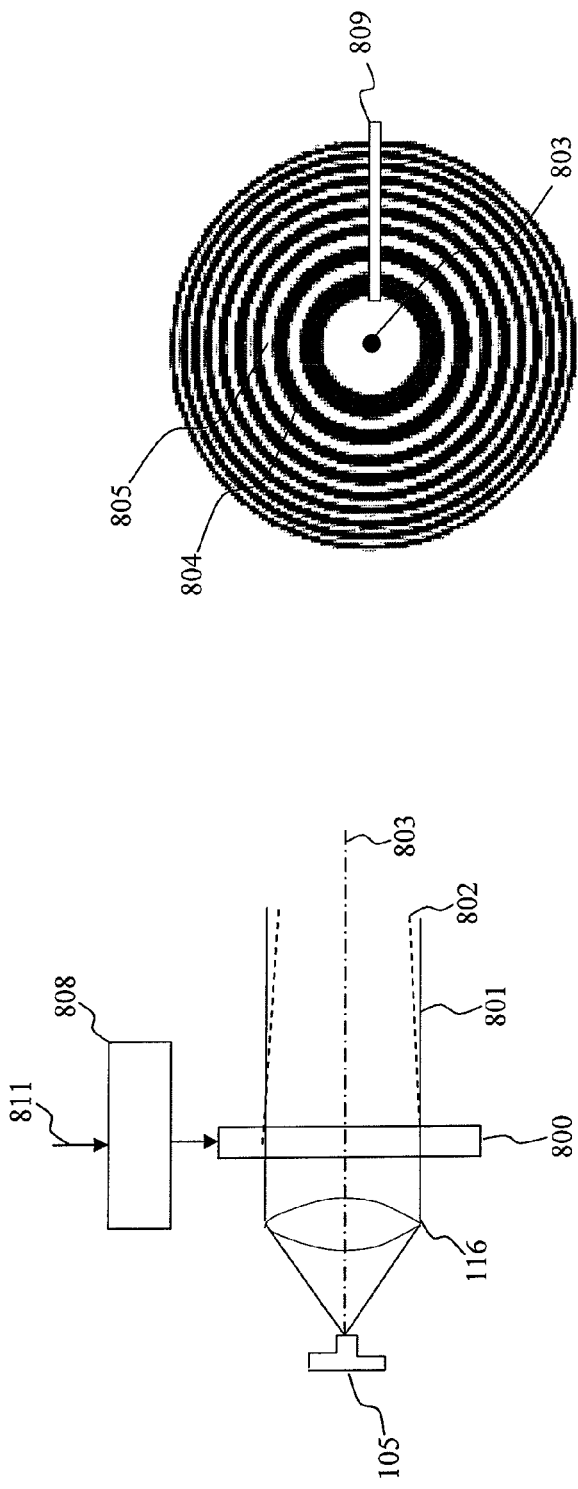
Figure 15:
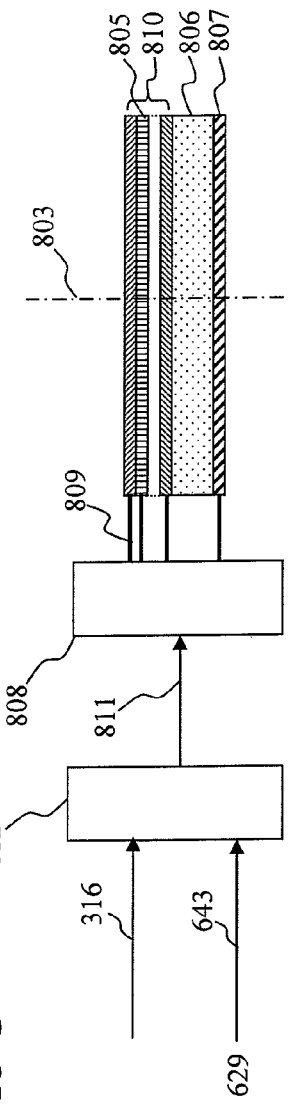

In the above-described example, emission of a laser alternates with that of another laser. Now, a description will be given of another example in which a single laser 105 and a variable focus optical element 800 are used with reference to FIG. 15. To this end, a configuration shown in FIG. 15 replaces a portion 920 marked by a dotted line in FIG. 1. In addition, the semiconductor laser 5 and the driving circuit 200 in a portion 921 marked by a dotted line in FIG. 12 are removed from the configuration of the FIG. 12. In FIG. 15A, the light beam emitted from the semiconductor laser 5 is converted into a parallel beam by a coupling lens 116. The parallel beam enters a variable focus optical element 800, which is placed perpendicularly to the optical axis 803. The variable focus optical element 800 makes the light beam that passes therethrough transform from a parallel light beam 801 to a converging or a diverging light beam 802.

FIG. 15C shows a cross section of the variable focus optical element 800. The variable focus optical element 800 has a structure in which liquid crystal molecules 8 are held by and between a glass substrate 810 and another glass substrate 807. The glass substrate 810 includes M patterns of laminated transparent electrode patterns 805, each of which is in a shape of a Fresnel zone plate. In contrast, the glass substrate 807 has no such patterns. Application of a voltage to a particular transparent electrode pattern 805 changes the orientation of the liquid crystal molecules, and the change in the orientation generates phase difference between the liquid crystal molecules and the linearly-polarized light along the original orientation. As a result, diffractive lens effects occur and change the focal point of the light beam passing through the optical element.

FIG. 15B shows the electrode pattern 805 when viewed from the light incident side. While the transparent electrode is expressed as the portion 805 in solid white in FIG. 15B, there is no transparent electrode in the portion 804 in solid black. Application of voltage to the portion 804 does not change the orientation of the liquid crystal molecules, so that the incident light passes through the optical element 800 with no phase change taking place. Common electrodes 809 are connected with each of the transparent electrodes to supply voltage thereto.

The sampling logic signal 316 outputted from the timing generation circuit 310 is inputted into a spot control circuit 812. Another signal 643 is also inputted into the circuit 812. The signal 643 is outputted from the circuit 629 for generating a signal for controlling the light-beam spot, and drives the wedge glass. Consequently, an order signal 811 for driving the liquid crystal is generated. The order signal 811 is inputted into a liquid-crystal driving circuit 808. The order signal 811 includes a signal for instructing which one of the M patterns is to be driven in accordance with a signal 643 for driving the wedge glass. Also included is a signal for applying or not applying voltage to the pattern in accordance with the sampling logic signal 316. Specifically, voltage is applied to the pattern selected by the signal 643 when the sampling logic signal has a value "1." No voltage is applied to any pattern when the sampling logic signal 316 has a value "0."

The common electrodes 809 are connected with the liquid crystal driving circuit 808. In accordance with the order signal 811, one of the M common electrodes is selected. The M patterns of Fresnel zone plate are formed so as to have different focal lengths. With no voltage applied, the light beam that has passed through the variable focus optical element 800 becomes a parallel beam, and the parallel beam is focused on the servo layer 106 after passing through the objective lens 8. With one of the M patterns being selected, the light beam that has passed through the variable focus optical element 800 becomes a diverging or a converging beam. The resultant beam, either diverging or converging, is focused on the corresponding one of the M recording layers after passing through the objective lens. Accordingly, when the control signal in the servo area is read from the servo layer 106, no voltage is applied while the light emission power of the semiconductor laser 115 is set at the retrieving power Pb1. When data is recorded in a particular one of the M recording layers, a voltage is applied so that the particular one of the recording layers can be selected while the power of the semiconductor laser 115 is modulated. When data is retrieved from a particular one of the M recording layers, a voltage is applied so that the desired one of the recording layers can be selected while the light emission power of the semiconductor laser 5 is set at the retrieving power Pr1. With this configuration, the recording and retrieving of data can be carried out with a single semiconductor laser by switching among points of the spot on the optical axis.

Example 4

Regarding the servo layer shown in FIG. 6 and FIG. 7, the entire portion except for the servo area 401 preferably has a low reflectivity (a high transmittance). Then, another example will be described in which only a concave pit is left for indicating information on each servo area 401.

Figure 16B:
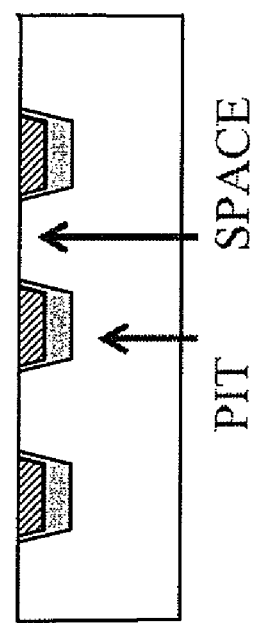
FIG. 16 describes a principle of fabricating a servo layer according to an embodiment of the present invention.
Figure 16A:
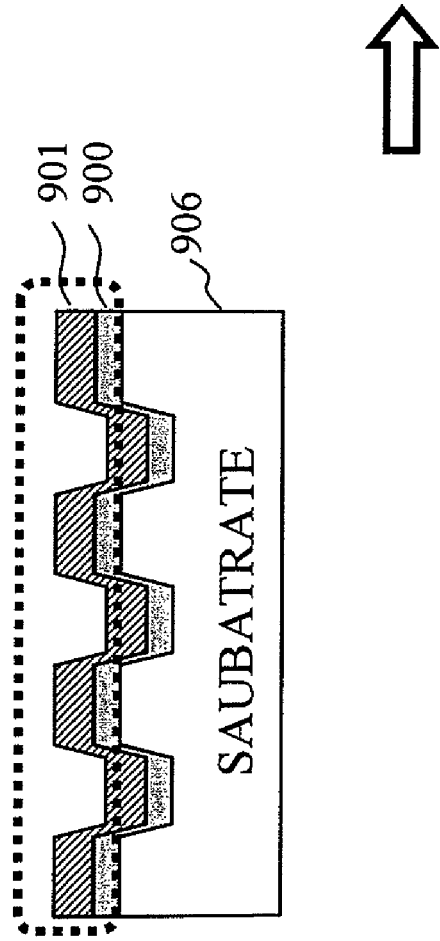

To begin with, a description will be given of a method of fabricating a disk shown in FIG. 16. Recording pits of a substrate or a sheet 906 are fabricated using an ordinary mastering apparatus. A resist is applied to a glass substrate. Pulses of focused laser beam are eradiated to expose the resist while the resultant sample is rotating so that servo areas can be formed discretely in the circumferential direction. The exposed areas are developed to be formed into a pit shape. Using the resultant substrate as a master, a stamper is fabricated by Ni plating. The stamper heated to a high temperature is pressed on a disk-shaped polycarbonate substrate, or sheet, with an approximately 0.1-mm thickness and a 120-mm diameter. The pit shape of the stamper is transferred to the substrate, or sheet in this way, and a substrate 906 is thus fabricated.

An Al film 900 and a ZnS—$SiO_2$ film 901 are formed on the substrate 906 by spattering. These films on the sample are polished by chemical-machanical polishing. The film in the pits is left as it is, but the Al on the space portions is removed. In this way, Al as a reflecting material can be left in the pits. In the processing of chemical polishing, the sample is rotated in plane. While an abrasive liquid is being supplied, a polishing pad is pressed onto the surface of the sample. By moving this polishing pad from the inner radius of the disk to the outer radius thereof, the entire surface of the disk is polished. In this way, concave pits (reflective pits) indicative of information with high reflectivity are formed only in the servo areas while the rest of the servo layer can be made transparent.

Regarding the data layer shown in FIG. 6 and FIG. 7, the entire data layer except for data area, that is, areas 420 or 424, is preferably transparent. An example to accomplish this object will be described hereinbelow. In the case where areas 420 and 424 are formed, the recording film is formed by a deposition method or a spattering method. Here, a mask to cover the servo areas in the radial direction of the disk is placed on the disk to prevent the recording films from being formed in areas 424 and 420, which overlap the servo areas. Alternatively, regarding the recording films described in Example 2, the electrode layer may be partially removed for the areas 420 and 424. In still another method of fabrication, the recording of areas 424 and 420 is carried out, using two lasers with different wavelengths, before the shipment of the disk. One of the two lasers is used for extracting signal from the servo area, and the other laser is used for recording successively the areas 424 and 420. The areas 424 and 420 thus formed lose the electrochromic characteristics, and become transparent. Though the two lasers overlap with each other in the areas 424 and 420, by placing a wavelength separation filter in front of the sensor to provide two detecting systems, control signals can separately be detected. Then, the areas 420 and 424 can be made transparent.

What is claimed is:

1. A multi-layer optical disk comprising:
   a plurality of recording layers;
   a servo layer combined with the plurality of recording layers to form a set;
   servo areas for detecting a track error signal and a focus error signal, the servo areas being formed discretely along a track in the servo layer; and
   non-recording areas formed discretely in the recording layer,
   wherein the non-recording areas in the recording layer and the servo areas in the servo layer are arranged so as to overlap each other when viewed from the light incident side.

2. The multi-layer optical disk according to claim 1, wherein, when viewed from the light incident side, the servo layer is positioned farther than the plurality of recording layers, and
   the non-recording areas in the recording layer are transparent areas.

3. The multi-layer optical disk according to claim 1, wherein, when viewed from the light incident side, the servo layer is positioned nearer than the plurality of recording layers, and
   the servo layer is transparent except for the servo areas.

4. The multi-layer optical disk according to claim 1, wherein a recording film is formed all over the areas of each recording layer, except for the non-recording areas.

5. The multi-layer optical disk according to claim 1,
   wherein the servo layer is a transparent layer, and
   each servo area has a concave part in which a reflective pit is formed while a reflective film is embedded in the pit.

6. The multi-layer optical disk according to claim 1, further comprising a plurality of sets each of which is composed of a plurality of voltage-selective type recording layers and a single servo layer.

7. An information recording and retrieval method for a multi-layer optical disk including a plurality of recording layers and a single servo layer which layers together form a set, servo areas for detecting a track error signal and a focus error signal, which areas are formed discretely along a track in the servo layer, non-recording areas which are formed discretely in the recording layer, and in the optical disk, the non-recording areas in the recording layer and the servo areas in the servo layer being arranged so as to overlap with each other when viewed from the light incident side, the method comprising the steps of:
   making a first laser beam and a second laser beam enter the multi-layer optical disk along the optical axis of an objective lens, and making the resultant beams converge respectively in positions on the optical axis, the positions being different from each other;
   detecting the first laser beam which interacts with the servo layer;
   generating a sampling logic signal from the first laser beam detection signal;
   turning on alternately the first laser beam and the second laser beam in accordance with the sampling logic signal;
   deriving a track error signal and a focus error signal for the servo layer while the first laser beam is turned on;
   controlling the relative position of an objective lens to the multi-layer optical disk by use of the track error signal and the focus error signal, and making the spot of the first laser beam follow a desired track in the servo layer;
   detecting the second laser beam while the second laser beam is turned on, the second laser beam interacting with one of the plurality of recording layers, and deriving a focus error signal of the second laser beam for the recording layer; and
   focusing the spot of the second laser beam on the recording layer by use of a focus error signal for the second laser beam.

8. The information recording and retrieval method according to claim 7 wherein the first and the second laser beams are formed with two lasers.

9. The information recording and retrieval method according to claim 7, wherein the first and the second laser beams are formed from a light beam emitted from a single laser by converting the light beam into any one of a diverging beam, a parallel beam, and a converging beam.

10. The information recording and retrieval method according to claim 9, wherein the emitting intensity of the laser is varied in accordance with the timing at which the light beam is converted into any one of a diverging beam, a parallel beam, and a converging beam.

11. The information recording and retrieval method according to claim 7,
    wherein while the second laser beam is turned on, a signal is detected, the signal being in association with the intensity of the second laser beam interacting with the recording layer, and
    the signal is demodulated to generate a retrieving signal.

12. The information recording and retrieval method according to claim 7, wherein, while the second laser beam is turned on, the second laser beam is modulated by recording information and information is recorded in the recording layer.

13. An information recording and retrieval apparatus for a multi-layer optical disk including a plurality of recording layers and a single servo layer which layers together form a set, servo areas for detecting a track error signal and a focus error signal, which areas are formed discretely along a track in the servo layer, non-recording areas which are formed discretely in the recording layer, and in the optical disk, the non-recording areas in the recording layer and the servo areas in the servo layer being arranged so as to overlap with each other when viewed from the light incident side, the apparatus comprising:
    a first laser beam generating means;
    a second laser beam generating means;
    an optical system for linking the first laser beam and the second laser beam on a single axis;
    an objective lens for converging the linked first laser beam onto the servo layer, and for converging the second laser beam onto one of the plurality of recording layers;
    an actuator for driving the objective lens;

a photodetector having a focus error detector and a track error detector;

a timing generation circuit for generating a timing signal for irradiating alternately the first laser beam and the second laser beam in accordance with the output of the track error detector;

a first focus servo block for driving the actuator in the optical axis direction in accordance with the output of the track error detector while the first laser beam is turned on;

a tracking servo block for driving the actuator in a direction perpendicular to the optical axis in accordance with the output while the first laser beam is turned on; and a second focus servo block for driving the spot of the second laser beam in the optical axis direction in accordance with the output of the focus detector while the second laser beam is turned on.

14. The information recording and retrieval apparatus according to claim 13, further comprising:

a circuit for detecting a signal corresponding to the reflected light intensity of the second laser beam interacting with one of the plurality of recording layers while the second laser beam is turned on; and a demodulation circuit for demodulating the detected signal.

15. The information recording and retrieval apparatus according to claim 13, further comprising a modulation circuit for modulating recording information by a recording clock wherein the second laser beam is modulated by the output of the modulation circuit when data is recorded in the recording layer, and while the second laser beam is turned on.

16. The information recording and retrieval apparatus according to claim 13, wherein the photodetector detects, through the objective lens, the light beam reflected from the multi-layer optical disk.

17. The information recording and retrieval apparatus according to claim 13, further comprising means for selecting a desired recording layer from the plurality of recording layers as the recording layer onto which the second laser beam is converged.

18. The information recording and retrieval apparatus according to claim 13, wherein the multi-layer optical disk includes a plurality of sets each of which is composed of a plurality of recording layers and a single servo layer, and further comprising means for selecting a desired servo layer from the plurality of servo layers as the servo layer onto which the first laser beam is converged.

19. The information recording and retrieval apparatus according to claim 13, wherein two laser light sources are used to generate the first laser beam and the second laser beam.

20. The information recording and retrieval apparatus according to claim 13 further comprising:

a single laser light source; and a converting means for converting the light beam emitted from the laser light source into any one of a diverging beam, a parallel beam, and converging beam, wherein, by passing the light beam emitted from the laser light source through the conversion means, the first laser beam and the second laser beam are generated.

* * * * *